United States Patent
Leu et al.

(10) Patent No.: US 6,829,416 B2
(45) Date of Patent: Dec. 7, 2004

(54) TUNABLE OPTICAL WAVELENGTH DEMULTIPLEXER

(75) Inventors: Charles Leu, Fremont, CA (US); Ga-Lane Chen, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 92 days.

(21) Appl. No.: 10/404,750

(22) Filed: Mar. 31, 2003

(65) Prior Publication Data

US 2004/0105622 A1 Jun. 3, 2004

(30) Foreign Application Priority Data

Nov. 29, 2002 (TW) .................................. 91134741 A

(51) Int. Cl.$^7$ .............................. G02B 6/12; G02B 6/34
(52) U.S. Cl. .............................. 385/37; 385/14; 385/24; 385/47
(58) Field of Search .............................. 385/10, 14, 24, 385/37, 46, 47; 359/569, 572; 398/84

(56) References Cited

U.S. PATENT DOCUMENTS

| | | | | |
|---|---|---|---|---|
| 4,950,042 A | * | 8/1990 | Gaylor et al. .................. | 385/3 |
| 6,226,426 B1 | * | 5/2001 | Magne et al. .................. | 385/24 |
| 6,731,839 B2 | * | 5/2004 | Bhagavatula et al. ......... | 385/37 |
| 2004/0105621 A1 | * | 6/2004 | Leu et al. ...................... | 385/37 |

* cited by examiner

Primary Examiner—Akm Enayet Ullah
Assistant Examiner—Omar Rojas
(74) Attorney, Agent, or Firm—Wei Te Chung

(57) ABSTRACT

A tunable optical wavelength demultiplexer (10) has a plurality of demultiplexer units (113, 114, 115, 116) formed on a planar waveguide (111). Every demultiplexer unit comprises a plurality of input waveguide channels, a plurality of output waveguide channels, and a Bragg grating, said each input waveguide channel coupling with the Bragg grating at a different angle, and each output waveguide channel being a mirror image of a corresponding input waveguide channel. Bragg gratings of demultiplexer units are parallel each other. Corresponding input waveguide channels are parallel to each other. An adjustable mechanism (100) adjusts an input port (25) and output ports (271, 272, 273, 274) to couple with a desired input waveguide channel and corresponding output waveguide channels.

19 Claims, 3 Drawing Sheets

TUNABLE OPTICAL WAVELENGTH DEMULTIPLEXER

BACKGROUND OF THE INVENTION

1. Field of the Invention

The present invention generally relates to optical wavelength demultiplexers, and more particularly to a tunable optical wavelength demultiplexer. This application related to a contemporaneously filed application having the same applicants and the same assignee with the invention, and titled "TUNABLE FILTERED DEVICE".

2. Description of Prior Art

Optical wavelength demultiplexers have -been commonly used in multi-wavelength optical communications. An optical wavelength demultiplexer can be constructed of a plurality of Bragg gratings connected together. When light with a plurality of wavelengths is incident on such an optical wavelength demultiplexer, light of a first wavelength is reflected by a first Bragg grating, and light at the remaining wavelengths passes through the first Bragg grating and reaches a second Bragg grating, where light of a second wavelength is reflected. Thus, light with a plurality of wavelengths is demultiplexed into a plurality of beams after passing through the optical wavelength demultiplexer, wherein each beam has a different wavelength.

Referring to FIG. 5, U.S. Pat. No. 5,818,986 discloses a conventional optical wavelength demultiplexer 99 which includes a plurality of Bragg gratings 901, 902, 903 located in a planar waveguide 91. Dots 904 indicate unshown Bragg gratings located between the Bragg gratings 902, 903. Light 914 at a plurality of wavelengths $\lambda_1$, $\lambda_2$, to $\lambda_N$ is received at an input port and passes through a channel 911 to be incident on the first Bragg grating 901 at a predeterminated acute angle. Light 915 at a particular wavelength $\lambda_1$ is reflected by the first Bragg grating 901 to a channel 921 and is output through a first output port. Light at the remainder wavelengths passes through the first Bragg grating 901 and is incident on the second Bragg grating 902. In a similar process, the remainder wavelengths from the first Bragg grating 901 are successively split into a plurality of beams at a plurality of Bragg gratings, each beam having a particular wavelength. The wavelength of each reflected beam is determined by properties of Bragg grating which reflects the beam.

However, the convention optical wavelength demultiplexer has a shortcoming. That is, the demultiplexed wavelengths of output light are fixed when the optical wavelength demultiplexer is manufactured.

Therefore, an improved optical wavelength demultiplexer which has the demultiplexed wavelengths of output light tunable is desired to overcome the shortcoming of the prior art.

SUMMARY OF THE INVENTION

Accordingly, an object of the present invention is to provide a tunable optical wavelength demultiplexer.

To achieve the above-mentioned object, a tunable optical wavelength demultiplexer in accordance with the present invention includes a plurality of demultiplexer units formed in a planar waveguide. Every demultiplexer unit comprises a plurality of input waveguide channels, a plurality of output waveguide channels and a Bragg grating. Every input waveguide channel angularly merges at a different acute angle with a normal of the Bragg grating, and every output waveguide channel is a mirror image of every input waveguide channel. The Bragg grating of every demultiplexer unit has a different period, input waveguide channels of every demultiplexer unit can receive light from corresponding input waveguide channels of the previous demultiplexer unit.

BRIEF DESCRIPTION OF THE DRAWINGS

Other objects, advantages and novel features of the present invention will be drawn from the following detailed description of a preferred embodiment of the present invention with attached drawings, in which.

DETAILED DESCRIPTION OF PREFERRED EMBODIMENT

Figure 1:
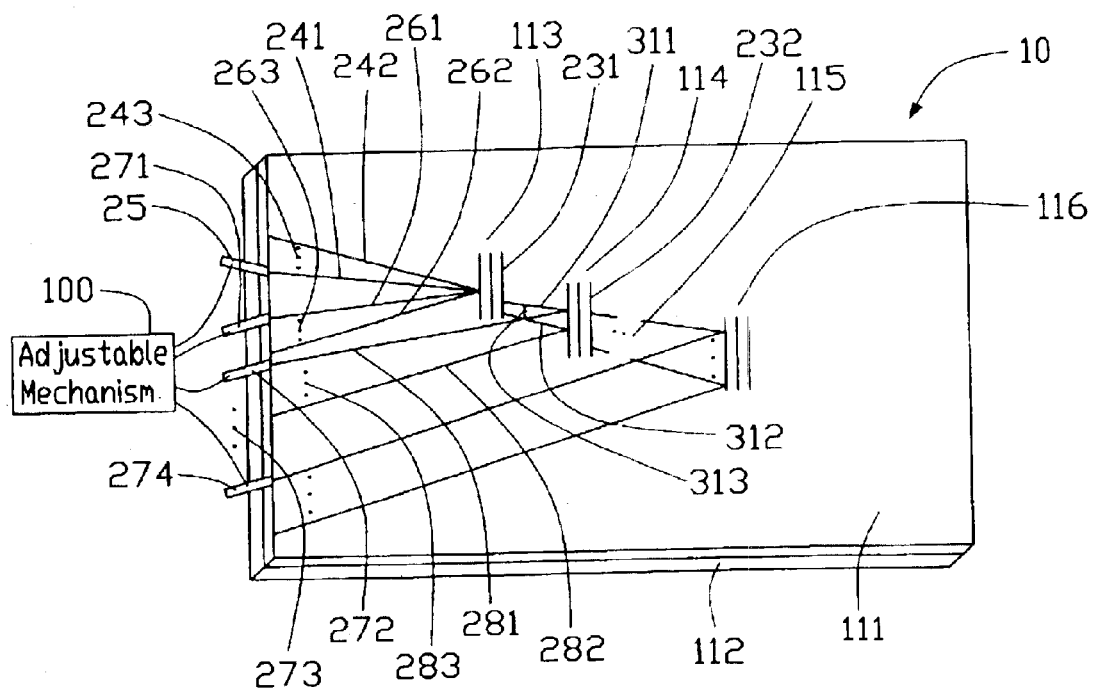
FIG. 1 is a schematic diagram of a tunable optical wavelength demultiplexer in accordance with a first embodiment of the present invention.

Referring to FIG. 1, a tunable optical wavelength demultiplexer 10 in accordance with a first embodiment of the present invention comprises a plurality N of cascading demuplexer units 113, 114, 115, 116 which are formed on a planar waveguide 111. Dots 115 indicate unshown demultiplexer units located between the second and Nth demultiplexer units 114, 116. Every demultiplexer unit comprises a plurality of input waveguide channels, a plurality of output waveguide channels, and a Bragg grating. Each bragg grating has a different period. The planar waveguide 111 is made of germania-silica and is formed on a silicon substrate 112.

The first demultiplexer unit 113 comprises a plurality of input waveguide channels 241, 243, 242, a plurality of output waveguide channels 261, 263, 262, and a Bragg grating 231. Dots 243, 263 respectively indicate the unshown input and output waveguide channels. The plurality of input waveguide channels 241, 243, 242 are coupled with the Bragg grating 231, and each of them forms a different angle with a normal of the Bragg grating 231. Every output waveguide channel 261, 263, 262 is a mirror image of a corresponding input waveguide channel 241, 243, 242, and thus forms an angle with normal of the Bragg grating 231 which is equal to that formed by the corresponding input waveguide channel 241, 243, 242. An input port 25 selectively couples with one of the input waveguide channels 241, 243, 242 and a first output port 271 couples with an output waveguide channel which is a mirror image of the input waveguide channel coupled with the input port 25. In the drawing, the input port 25 couples with the input waveguide channel 241, and the first output port 271 therefore couples with the output waveguide channel 261.

The second demultiplexer unit 114 comprises a plurality of input waveguide channels 311, 313, 312, a plurality of output waveguide channels 281, 283, 282, and a Bragg grating 232. Dots 313, 283 respectively indicate the unshown input and output waveguide channels. The Bragg grating 232 of the second demultiplexer unit 114 is parallel with the Bragg grating 231 of the first demultiplexer unit 113, and the plurality of input waveguide channels 311, 313, 312 of the second demultiplexer unit 114 connect them together. The plurality of input waveguide channels 311, 313, 312 of the second demultiplexer unit 114 are respectively parallel to the corresponding input waveguide channels 241, 243, 242 of the first demultiplexer unit 113 for receiving light signals output from the first demultiplexer unit 113. Every output waveguide channel 281, 283, 282 is a mirror image of a corresponding input waveguide channel 311, 313, 312, and forms an angle with the normal of the Bragg grating 232 which is equal to that formed by the corresponding input waveguide channel 311, 313, 312 and the normal. A second output port 272 selectively couples with an output waveguide channel 281, 283, 282 of the second demultiplexer unit 114, which output waveguide channel corresponds to the input waveguide channel 311, 313, 312, which corresponds to the input waveguide channel 241, 243, 242 coupled to the input port 25. In the drawing, the second output port 272 therefore couples with the output waveguide channel 281.

An ith (i=3~N) demultiplexer unit comprises a plurality of input waveguide channels, a plurality of output waveguide channels and a Bragg grating. The Bragg grating of the ith demultiplexer unit is parallel with the Bragg grating 231 of the first demultiplexer unit 113, and the plurality of input waveguide channels of the ith demultiplexer unit 114 are connected between the Bragg grating of the ith and the (i-1)th demultiplexer units. The plurality of input waveguide channels of the ith demultiplexer unit are respectively parallel with corresponding input waveguide channels of an (i-1)th demultiplexer unit for receiving light from the (i-1)th demultiplexer unit. Every output waveguide channel is at a mirror image position of a corresponding input waveguide channel, and forms a same angle with the normal of the Bragg grating. An ith output port couples with an output waveguide channel of the ith demultiplexer unit.

When the input port 25 couples with a jth input waveguide channel of the first demultiplexer unit 113, input light transmits through the jth input waveguide channel of the first demultiplexer unit 113 and is incident on the Bragg grating 231 of the first demultiplexer unit 113. An angle $\theta_j$ is formed between the jth input waveguide channel and the normal of the Bragg of the first demultiplexer unit 113. A beam having a wavelength $\lambda_{ij}=2d_1/(1-(\sin^2/n_1^2))^{0.5}$, where $d_1$ and $n_1$ are respectively the grating period and refractive index of the Bragg grating 231, is reflected by the Bragg grating 231 to a jth output waveguide channel of the first demultiplexer unit 113, and is output through the first output port 271. Light of the remaining wavelengths passes through the Bragg grating 231 and a jth input waveguide channel of the second demultiplexer unit 114, and is incident on the Bragg grating 232 of the second demultiplexer unit 114. A beam having a wavelength $\lambda_{2j}=2d_2/(1-(\sin^2\theta_j/n_2^2))^{0.5}$ is reflected by the Bragg grating 232, and light of the remaining wavelengths passes through the Bragg grating 232 and is transmitted to the next demultiplexer unit. Since each Bragg grating has a unique grating period, each Bragg grating reflects a different wavelength of light. The ith demultiplexer unit accepts remaining wavelengths of light from its jth input waveguide channel and reflects a beam at a wavelength $\lambda_{ij}=2d_i/(1-(\sin^2\theta_j/n_i^2))^{0.5}$, where $d_i$ and $n_i$ are respectively the grating period and the refractive index of the Bragg grating of the ith demultiplexer unit, said the beam being output through the ith output port.

An adjustable mechanism 100 connects to the input and output ports 25, 271, 272, 273, 274 and controls them to couple with particular input and output waveguide channels.

Figure 2:
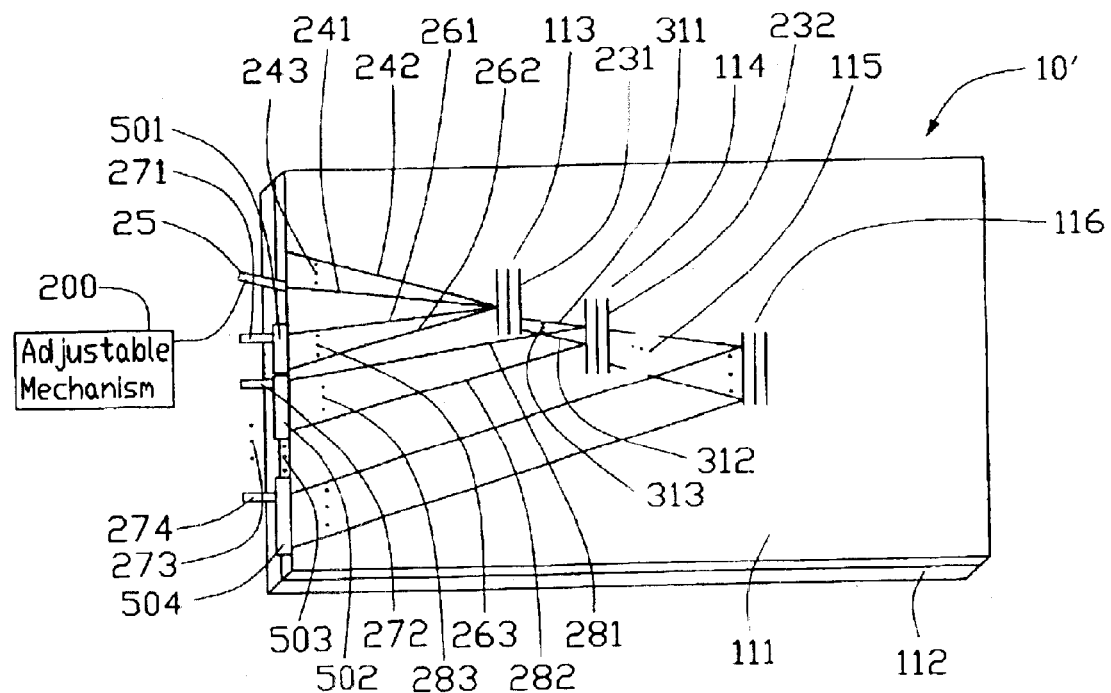
FIG. 2 is a schematic diagram of a tunable optical wavelength demultiplexer in accordance with a second embodiment of the present invention.

Referring to FIG. 2, a tunable optical wavelength demultiplexer 10' of a second embodiment of the present invention is disclosed. The tunable optical wavelength demultiplexer 10' is substantially identical to the tunable optical wavelength demultiplexer 10, but further comprises a plurality of couplers 501, 502, 503, 504. Dots 503 indicate the unshown couplers. The couplers each respectively couple with output waveguide channels of a corresponding demultiplexer unit. For example, the coupler 501 couples with the output waveguide channels 261, 263, 262 of the first demultiplexer unit 113. The output ports 271, 272, 273, 274 respectively connect with the corresponding couplers 501, 502, 503, 504. Thus light from every output waveguide channel can transmit to the output ports 271, 272, 273, 274 even though the output port is not adjusted. An adjustable mechanism 200 connects to the input port 25 and controls it to couple with a particular input waveguide channel.

Figure 3:
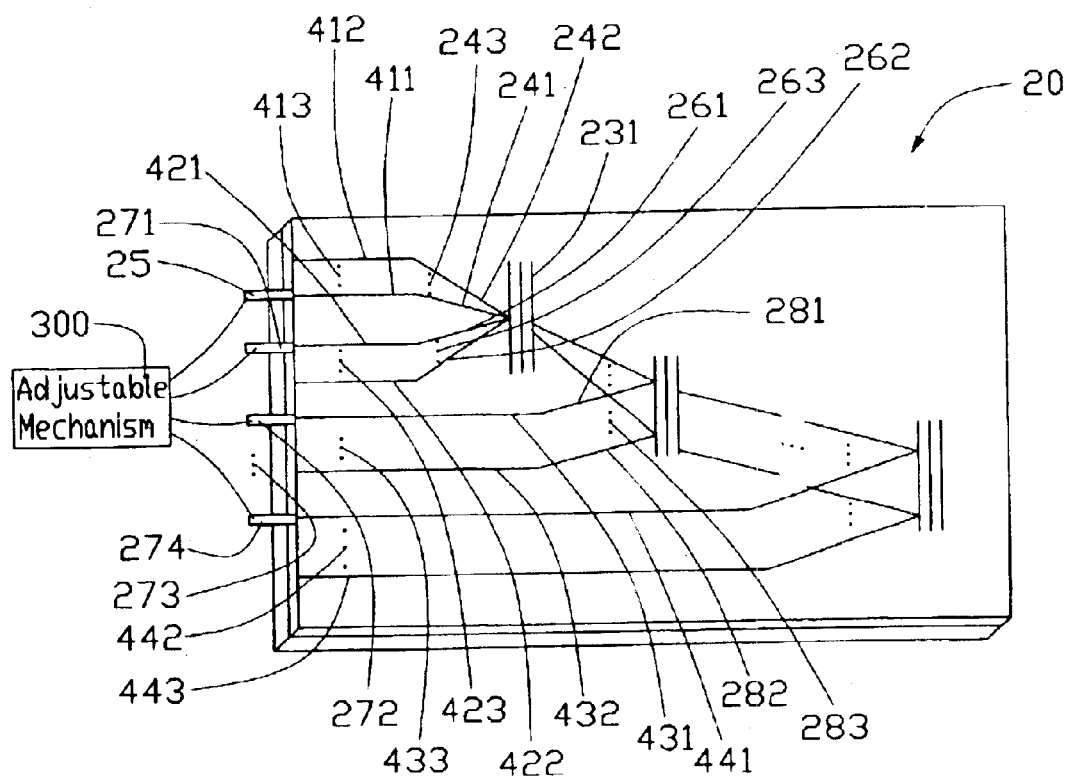
FIG. 3 is a schematic diagram of a tunable optical wavelength demultiplexer in accordance with a third embodiment of the present invention.

Referring to FIG. 3, a tunable optical wavelength demultiplexer 20 of a third embodiment of the present invention is disclosed. The tunable optical wavelength demultiplexer 20 is substantially identical to the tunable optical wavelength demultiplexer 10, but further comprises a plurality of channels 411, 412, 413, 421, 422, 423, 431, 432, 433, 441, 442, 443, all parallel to the normal of the Bragg grating 231. Dots 413, 423, 433, 443 indicate unshown channels. These channels connect to the input/output waveguide channels (241, 242, 243, 261, 262, 263, 281, 282, 282, other not labeled), and couple with input/output ports 25, 271, 272, 273, 274. An adjustable mechanism 300 adjusts the movement of input port 25 and output ports in a direction perpendicular to the normal of the Bragg grating 231.

Figure 4:
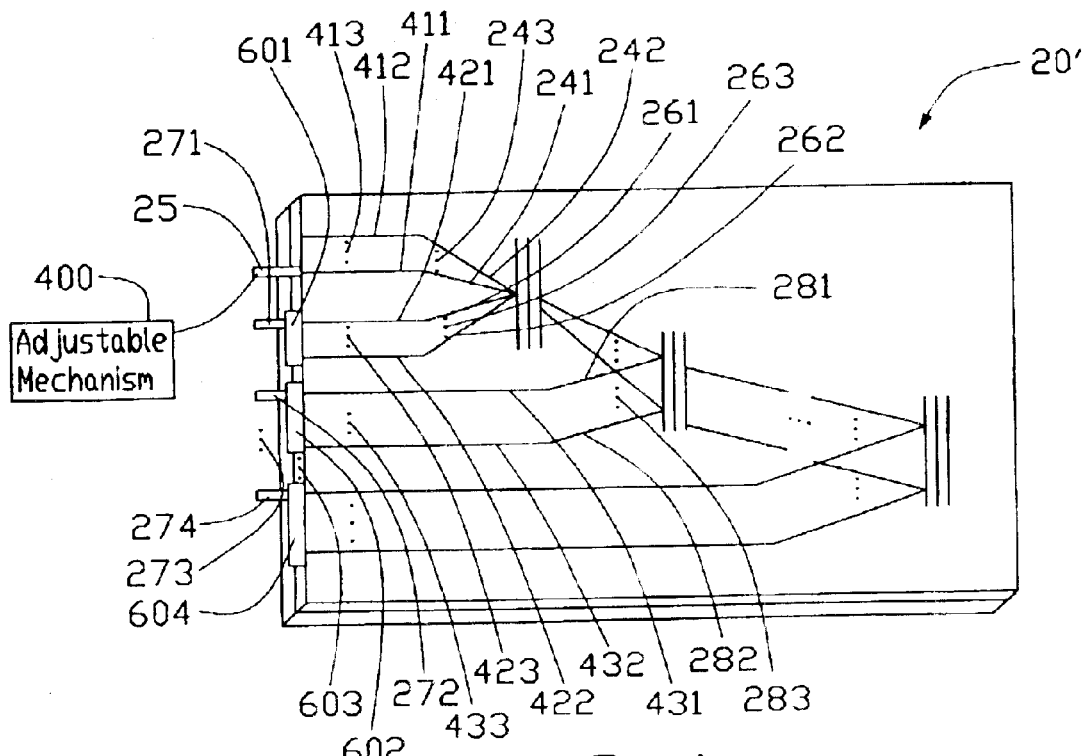
FIG. 4 is a schematic diagram of a tunable optical wavelength demultiplexer in accordance with a fourth embodiment of the present invention.
Figure 5:
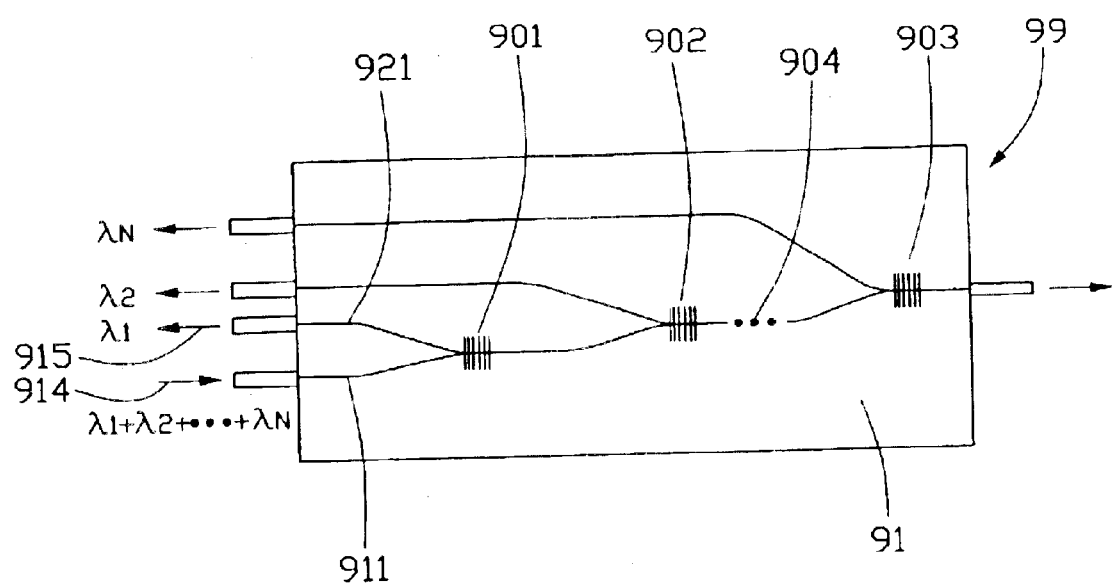
FIG. 5 is a schematic diagram of a conventional optical wavelength demultiplexer.

Referring to FIG. 4, a tunable optical wavelength demultiplexer 20' of a fourth embodiment of the present invention is disclosed. The tunable optical wavelength demultiplexer 20' is substantially identical to the tunable optical wavelength demultiplexer 20, but further comprises a plurality of couplers 601, 602, 603, 604. Dots 603 indicate the unshown couplers. The couplers respectively couple with corresponding channels. For example, the coupler 601 couples with the channels 421, 422, 423. The output ports 271, 272, 273, 274 respectively connect with the corresponding couplers 601, 602, 603, 604. Thus light from every channel can transmit to the output ports 271, 272, 273, 274 even though the output ports 271, 272, 273, 274 are not adjusted. An adjustable mechanism 400 connects to the input port 25 and controls its coupling with a particular channel.

Compared with convention optical wavelength demultiplexers, the optical wavelength demultiplexer in accordance with the present invention has a plurality of demultiplexer units connected together. Each demultiplexer unit has a plurality of input waveguide channels which couple with the normal of the demultiplexer unit at a different angel. When input light from the input port transmits to a predeterminate input waveguide channel, a corresponding series of output lights are demultiplexed. The demultiplexed waveguides of output light are tunable by adjusting the input port.

Although the present invention has been described with reference to a specific embodiment, it should be noted that the described embodiment is not necessarily exclusive and that various changes and modifications may be made to the described embodiment without departing from the scope of the invention as defined by the appended claims.

What is claimed is:

1. A tunable optical wavelength demultiplexer device, comprising:
   a planar waveguide;

a plurality of cascading demultiplexer units formed in the planar waveguide, said every demultiplexer unit comprising a plurality of input waveguide channels, a plurality of output waveguide channels and a Bragg grating, every input waveguide channel angularly merging at a different acute angle with a normal of the Bragg grating, and every output waveguide channel being a mirror image of every input waveguide channel;

an input port for emitting input light, which light transmits to an input waveguide channel of the first demultiplexer unit; and a plurality of output ports each for receiving light from a corresponding output waveguide channel of a corresponding demultiplexer unit;

wherein, the Bragg grating of every demultiplexer unit has a different period, and each input waveguide channel of every demultiplexer unit is arranged to receive light from the previous demultiplexer unit.

2. The tunable optical wavelength demultiplexer device in accordance with claim 1, wherein the Bragg grating of each demultiplexer unit is parallel with every other Bragg grating of the demultiplexer device, and corresponding input waveguide channels of every demultiplexer unit are parallel to each other.

3. The tunable optical wavelength demultiplexer device in accordance with claim 2, further comprising an adjustable mechanism for adjusting input and output ports.

4. The tunable optical wavelength demultiplexer device in accordance with claim 3, wherein the input port couples with an input waveguide channel of the first demultiplexer unit, the output ports respectively couple with a corresponding output waveguide channel of a corresponding demultiplexer unit.

5. The tunable optical wavelength demultiplexer device in accordance with claim 2, further comprising a plurality of input and output connection channels parallel to the normal of the Bragg grating, each of said input connection channels having two opposite ends, one end connecting to a corresponding input waveguide channel of the first demultiplexer unit, and the other end being connectable to the input port, said output connection channels also having two opposite ends and connecting to a corresponding output waveguide channel of a corresponding demultiplexer unit on one end thereof and being connectable to an output port on the other end.

6. The tunable optical wavelength demultiplexer device in accordance with claim 2, further comprising an adjustable mechanism for adjusting the input port.

7. The tunable optical wavelength demultiplexer device in accordance with claim 6, further comprising a plurality of couplers, the input port directly coupling with an input waveguide channel of the first demultiplexer unit, output waveguide channels of each demultiplexer unit coupling with a corresponding coupler, which couples with a corresponding output port.

8. The tunable optical wavelength demultiplexer device in accordance with claim 6, further comprising a plurality of couplers and a plurality of input and output connection channels parallel to the normal of the Bragg grating, each of said input connection channels having two opposite ends, one end connecting to a corresponding input waveguide channel of the first demultiplexer unit, and the other end being connectable to the input port, said output connection channels also having two opposite ends and connecting to a corresponding output waveguide channel of a corresponding demultiplexer unit on one end thereof and being connectable to an output port on the other end, a coupler being located between a corresponding output port and output connection channels of the corresponding demultiplexer unit.

9. The tunable optical wavelength demultiplexer device in accordance with claim 1, wherein the planar waveguide is made of germania-silica.

10. The tunable optical wavelength demultiplexer device in accordance with claim 9, wherein the planar waveguide is formed on a silicon substrate.

11. The tunable optical wavelength demultiplexer device in accordance with claim 1, wherein the light entering said every demultiplexer, is regulated by a formula of: $\lambda_{ij}=2d_i/(1-(\sin^2\theta_j/n_i^2))^{0.5}$ wherein $d_i$ and $n_i$ are respectively a grating period and a refractive index of the Bragg grating of the ith demultiplexer, $\theta_j$ is an incident angle relative to said ith demultiplexer, and $\lambda_{ij}$ is a wavelength of a light reflected from said ith demultiplexer.

12. A tunable optical wavelength demultiplexer device, comprising:

a planar waveguide;

a plurality of cascading demultiplexer units formed in the planar waveguide, said every demultiplexer unit comprising a plurality of input waveguide channels, a plurality of output waveguide channels and a Bragg grating, every input waveguide channel angularly merging at a different acute angle with a normal of the Bragg grating, and every output waveguide channel being a mirror image of every input waveguide channel;

a plurality of couplers, each coupler coupling to all the output waveguide channels of a corresponding demultiplexer unit;

an input port for emitting input light, which light transmits to an input waveguide channel of the first demultiplexer unit;

a plurality of output ports which respectively couple with a corresponding coupler, and respectively receive light from an output waveguide channel of a corresponding demultiplexer unit; and an adjustable mechanism for adjusting coupling of the input port with an input waveguide channel of the first demultiplexer unit;

wherein, the Bragg grating of every demultiplexer unit has a different period, and each input waveguide channel of every demultiplexer unit is arranged to receive light from the previous demultiplexer unit.

13. The tunable optical wavelength demultiplexer device in accordance with claim 12, wherein the Bragg grating of every demultiplexer unit is parallel to every other Bragg grating in the demultiplexer device.

14. The tunable optical wavelength demultiplexer device in accordance with claim 13, further comprising a plurality of input and output connection channels parallel to the normal of the Bragg grating, each of said input connection channels having two opposite ends, one end connecting to a corresponding input waveguide channel of the first demultiplexer unit, and the other end being connectable to the input port, said output connection channels also having two opposite ends and connecting to a corresponding output waveguide channel of a corresponding demultiplexer unit on one end thereof and being connectable to an output port on the other end, a coupler being located between a corresponding output port and output connection channels of the corresponding demultiplexer unit.

15. The tunable optical wavelength demultiplexer device in accordance with claim 12, wherein the planar waveguide is made of germania-silica, and is formed on a silicon substrate.

16. A tunable optical wavelength demultiplexer device, comprising:

a planar waveguide;

a plurality of cascading demultiplexer units formed in the planar waveguide, said every demultiplexer unit comprising a plurality of input waveguide channels, a plurality of output waveguide channels and a Bragg grating, every input waveguide channel angularly merging at a different acute angle with a normal of the Bragg grating, and every output waveguide channel being a mirror image of every input waveguide channel;

a plurality of couplers, each coupler coupling to all the output waveguide channels of a corresponding demultiplexer unit;

an input port for emitting input light, which light transmits to a input waveguide channel of the first demultiplexer unit;

a plurality of output ports which respectively couple with a corresponding coupler, and respectively receive light from a output waveguide channel of a corresponding demultiplexer unit; and an adjustable mechanism for adjusting coupling of the input port with an input waveguide channel of the first demultiplexer unit;

wherein, the Bragg grating of every demultiplexer unit has a different period, and is parallel to the other Bragg gratings of the demultiplexer device, and corresponding input waveguide channels of every demultiplexer unit are parallel to each other and receive light from the last demultiplexer unit.

17. The tunable optical wavelength demultiplexer device in accordance with claim 16, wherein the planar waveguide is made of germania-silica, and the planar waveguide is formed on a silicon substrate.

18. The tunable optical wavelength demultiplexer device in accordance with claim 17, wherein the input port directly couples with an input waveguide channel of the first demultiplexer unit, and the output ports respectively couple with corresponding output waveguide channels of corresponding demultiplexer units.

19. The tunable optical wavelength demultiplexer device in accordance with claim 17, further comprising a plurality of input and output connection channels parallel to the normal of the Bragg grating, each of said input connection channels having two opposite ends, one end connecting to a corresponding input waveguide channel of the first demultiplexer unit, and the other end being connectable to the input port, said output connection channels also having two opposite ends and connecting to a corresponding output waveguide channel of a corresponding demultiplexer unit on one end thereof and being connectable to an output port on the other end.

* * * * *